US011337539B2

(12) United States Patent
Li (10) Patent No.: US 11,337,539 B2
(45) Date of Patent: May 24, 2022

(54) INTEGRATED BREWING AND DRINKING UTENSIL

(71) Applicant: Mung Yuen Li, Kowloon (HK)

(72) Inventor: Mung Yuen Li, Kowloon (HK)

( * ) Notice: Subject to any disclaimer, the term of this patent is extended or adjusted under 35 U.S.C. 154(b) by 305 days.

(21) Appl. No.: 16/559,352

(22) Filed: Sep. 3, 2019

(65) Prior Publication Data

US 2020/0337490 A1 Oct. 29, 2020

(30) Foreign Application Priority Data

Apr. 29, 2019 (CN) .......................... 201920605985.9

(51) Int. Cl.
| | |
|---|---|
| *A47J 31/20* | (2006.01) |
| *A47G 19/16* | (2006.01) |
| *A47G 19/22* | (2006.01) |
| *A47J 31/00* | (2006.01) |
| *A47J 31/06* | (2006.01) |

(52) U.S. Cl.
CPC .............. *A47J 31/20* (2013.01); *A47G 19/16* (2013.01); *A47G 19/2205* (2013.01); *A47J 31/005* (2013.01); *A47J 31/06* (2013.01)

(58) Field of Classification Search
CPC .......... A47J 31/20; A47J 31/005; A47J 31/06; A47G 19/16; A47G 19/2205
See application file for complete search history.

(56) References Cited

U.S. PATENT DOCUMENTS

| | | | |
|---|---|---|---|
| 5,832,809 | A | 11/1998 | Gras |
| 2003/0178419 | A1 | 9/2003 | Policappelli |
| 2006/0162572 | A1 | 7/2006 | Liu et al. |
| 2010/0031827 | A1 | 2/2010 | Lai |

(Continued)

FOREIGN PATENT DOCUMENTS

| | | |
|---|---|---|
| CN | 202146147 U | 2/2012 |
| CN | 104323659 A | 2/2015 |

(Continued)

OTHER PUBLICATIONS

PCT International Search Report and Written Opinion dated May 27, 2020 issued in PCT/CN2020/084531.

(Continued)

*Primary Examiner* — Omar Flores Sanchez
(74) *Attorney, Agent, or Firm* — Locke Lord LLP (57) ABSTRACT

An integrated brewing and drinking utensil comprises a first liquid receiver body, a second liquid receiver body, a connector, a sealing member and a filter. The first liquid receiver body includes a first end and a first open end. The second liquid receiver body includes a second end and a second open end. The connector includes a channel having a first connection end and a second connection end. The first connection end is detachably connected to the first open end, and the second connection end is detachably connected to the second open end. The first connection end is hermetically connected to the connector through the sealing member, and/or the second connection end is hermetically connected to the connector through the sealing member. The filter is provided with a filtering hole. The filter is connected to the connector and is located between the first connection end and the second connection end.

18 Claims, 7 Drawing Sheets

(56) References Cited

U.S. PATENT DOCUMENTS

2014/0356501 A1* 12/2014 Juris ................. A47J 31/20
  426/433
2017/0000289 A1*  1/2017 Feber ............... A47J 31/002
2018/0344072 A1* 12/2018 Kalbfleisch ......... A47J 31/18
2020/0315395 A1* 10/2020 Backstrom ........ A47J 31/005

FOREIGN PATENT DOCUMENTS

| | | |
|---|---|---|
| CN | 204158140 U | 2/2015 |
| CN | 107595060 A | 1/2018 |
| CN | 209983947 U | 1/2020 |
| DE | 3441970 C1 | 2/1986 |

OTHER PUBLICATIONS

Extended European Search Report dated Feb. 28, 2020, issued during the prosecution of European Patent Application No. EP 19198056.4.

European Communication Pursuant to Art. 94 (3) EPC dated Jul. 30, 2021, issued during the prosecution of European Patent Application No. 19198056.4.

EP Communication Pursuant to Art. 94(3) EPC, dated Jan. 19, 2022, issued during the prosecution of European Patent Application No. EP 19198056.4, 4 pages.

* cited by examiner

INTEGRATED BREWING AND DRINKING UTENSIL

CROSS-REFERENCE TO RELATED APPLICATION

This non-provisional application claims priority to and benefit of, under 35 U.S.C. § 119(a), Patent Application No. 201920605985.9 filed in P.R. China on Apr. 29, 2019, the entire contents of which are hereby incorporated by reference in their entirety.

TECHNICAL FIELD

The present disclosure relates to the field of drinking utensils, and in particular, to an integrated brewing and drinking utensil.

BACKGROUND ART

Tea drinking is becoming increasingly popular in our daily life. There are many ways to make tea, for example, making tea by using special tea-making tools. The inventor has found that these tea-making tools are bulky and have too many parts, which are inconvenient to carry around.

A portable cup includes a cup body and a lid. The cup includes a consecutive accommodating chamber. The lid is fastened to the cup body or is detachably connected to the cup body by using other structures.

The inventor has found that, in the existing cups, either an extra tea-leaf funnel is required to make tea, which results in a more complicated structure, or tea leaves are placed directly in the cup body for brewing. In the latter manner, tea water cannot be separated from the tea leaves, and the tea leaves easily enter the mouth of a user when the user drinks the tea, making drinking inconvenient.

SUMMARY OF THE DISCLOSURE

The present disclosure proposes an integrated brewing and drinking utensil, for optimizing the structure of integrated brewing and drinking utensils and increasing the function of integrated brewing and drinking utensils. The integrated brewing and drinking utensil provided in the below technical solution can function as a brewing utensil and a drinking utensil at the same time and is convenient to operate and use.

An integrated brewing and drinking utensil is provided in an embodiment of the present disclosure, comprising:

a first liquid receiver body including a first end and a first open end;

a second liquid receiver body including a second end and a second open end;

a connector including a channel, wherein the channel includes a first connection end and a second connection end; the first connection end is detachably connected to the first open end, and the second connection end is detachably connected to the second open end;

a sealing member, through which the first connection end is hermetically connected to the connector and/or the second connection end is hermetically connected to the connector; and a filter provided with a filtering hole, wherein the filtering hole is configured to allow fluid to pass through; and the filter is located between the first connection end and the second connection end and connects the first liquid receiver body and the second liquid receiver body.

In some embodiments, the filtering hole is configured to block solid and allow fluid to pass through.

In some embodiments, the filter is detachably connected to, or fixedly connected to, or integrated with the connector.

In some embodiments, a first ring member is disposed on an inner wall of the connector, and an inner edge of the first ring member is connected to a second ring member; and the size of the first ring member along an axis direction of the connector is smaller than that of the second ring member along the axis direction of the connector; a groove is formed between the first ring member and the second ring member, and the sealing member is mounted in the groove.

In some embodiments, the sealing member includes a connection part and an abutment part, which are connected or integrated; the connection part is inserted into the groove, and the abutment part abuts against an end face of the second ring member.

In some embodiments, there are two grooves; one is located on the side of the first connection end, and the other is located on the side of the second connection end; and the sealing member is mounted in each of the grooves.

In some embodiments, the filter is sandwiched by the abutment part and an end face of the second ring member.

In some embodiments, the first ring member is integrated with the connector, and the first ring member is also integrated with the second ring member.

In some embodiments, the first connection end is connected to the first open end by threads; and/or, the second connection end is connected to the second open end by threads.

In some embodiments, one of the first end and the second end is constructed as one of the following structures, and the other is closed: a rotatable opening and closing structure, a pressable opening and closing structure, and an engageable opening and closing structure, for drinking drinks in the first liquid receiver body and the second liquid receiver body; or both the first end and the second end are constructed as one of the following structures: a rotatable opening and closing structure, a pressable opening and closing structure, and an engageable opening and closing structure, for drinking drinks in the first liquid receiver body and the second liquid receiver body; or both the first end and the second end are closed.

In some embodiments, the first open end and the second open end are constructed to be detachably connected.

In some embodiments, the cross-section shape of the filtering hole includes at least one of the following: a herringbone shape, a circle shape, a slit shape, and a rectangle shape.

The integrated brewing and drinking utensil provided in the above technical solution includes a first liquid receiver body and a second liquid receiver body, and a connector is disposed between the first liquid receiver body and the second liquid receiver body, through which a closed inner cavity of the integrated brewing and drinking utensil is formed. A filter disposed between the first liquid receiver body and the second liquid receiver body has a function of allowing fluid to pass through but not allowing large-sized solid such as tea leaves to pass through, so that the integrated brewing and drinking utensil can function as a filtering utensil, a tea-brewing utensil and a drinking utensil at the same time, and can be used for brewing solid drinks such as tea, Chinese herbal medicine or coffee. The integrated brewing and drinking utensil is suitable for use in office, at home and outdoors.

BRIEF DESCRIPTION OF THE DRAWINGS

The accompanying drawings described here are used to provide further understanding of the present disclosure and form a part of this application. Schematic embodiments and their descriptions are used to interpret the present disclosure and do not constitute an undue limitation to the present disclosure. In the drawings.

DETAILED DESCRIPTION

The technical solutions provided in the present disclosure are elaborated in more detail below with reference to FIG. 1 to FIG. 9.

Figure 1:
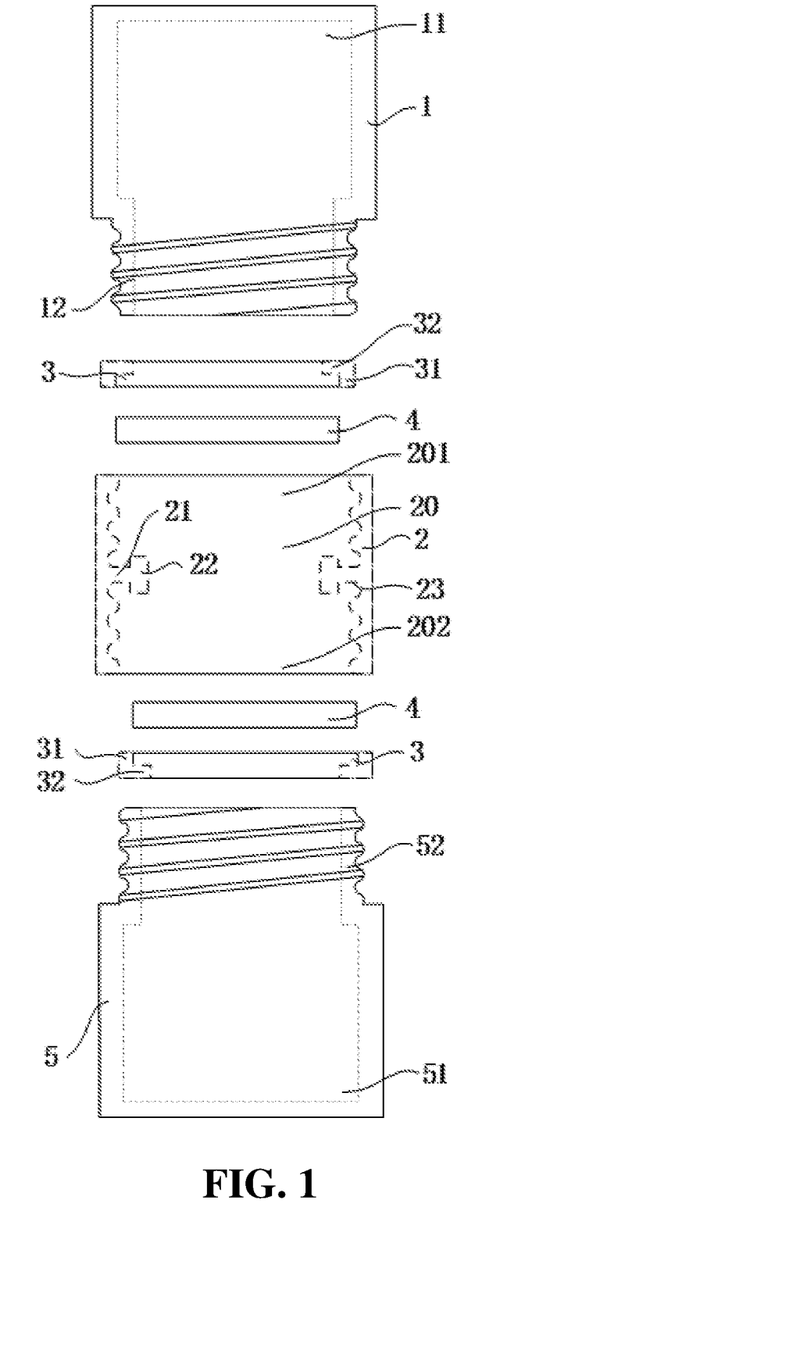
FIG. 1 is a schematic diagram of an exploded structure of an integrated brewing and drinking utensil according to some embodiments of the present disclosure.

Referring to FIG. 1, an integrated brewing and drinking utensil is provided in an embodiment to combine multiple functions, including brewing and drinking. Specifically, for example, the utensil is a cup, a pot, or the like. The integrated brewing and drinking utensil includes a first liquid receiver body 1, a second liquid receiver body 5, a connector 2, a sealing member 3 and a filter 4. The first liquid receiver body 1 includes a first end 11 and a first open end 12. The second liquid receiver body 5 includes a second end 51 and a second open end 52. The connector 2 includes a channel 20. The channel 20 includes a first connection end 201 and a second connection end 202. The first connection end 201 is detachably connected to the first open end 12, and the second connection end 202 is detachably connected to the second open end 52. The first connection end 201 is hermetically connected to the connector 2 through the sealing member 3, and/or the second connection end 202 is hermetically connected to the connector 2 through the sealing member 3. The filter 4 is provided with a filtering hole 41. The filtering hole 41 is configured to allow fluid to pass through. The filter 4 is connected to the connector 2. The filter 4 is located between the first connection end 201 and the second connection end 202 and connects the first liquid receiver body 1 and the second liquid receiver body 5.

The first end 11 and the first open end 12 are two opposite ends. The first end 11 is located at one end of the first liquid receiver body 1, and the first open end 12 is located at the other end of the first liquid receiver body 1.

The second end 51 and the second open end 52 are two opposite ends. The second end 51 is located at one end of the second liquid receiver body 5, and the second open end 52 is located at the other end of the second liquid receiver body 5.

In some embodiments, the first end 11 and the second end 51 are both closed, and drinking is realized by opening a connection between the connector 2 and at least one of the first open end 12 and the second open end 52.

Referring to FIG. 2a to FIG. 3c, in some embodiments, the first connection end 201 is connected to the first open end 12 by threads; and/or, the second connection end 202 is connected to the second open end 52 by threads.

In the above connection mode, it is easy to disassemble and assemble the first liquid receiver body 1 and the second liquid receiver body 5.

Figure 2A:
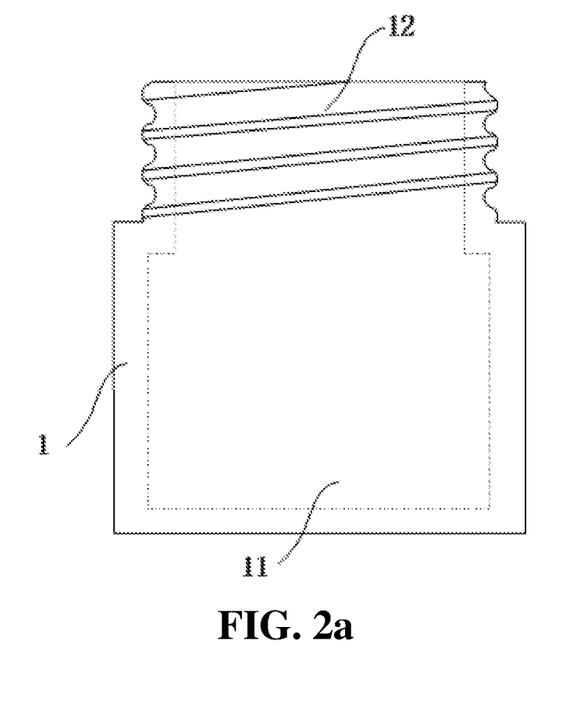
FIG. 2a is a schematic front diagram of the structure of a first liquid receiver body according to some embodiments of the present disclosure.
Figure 2B:
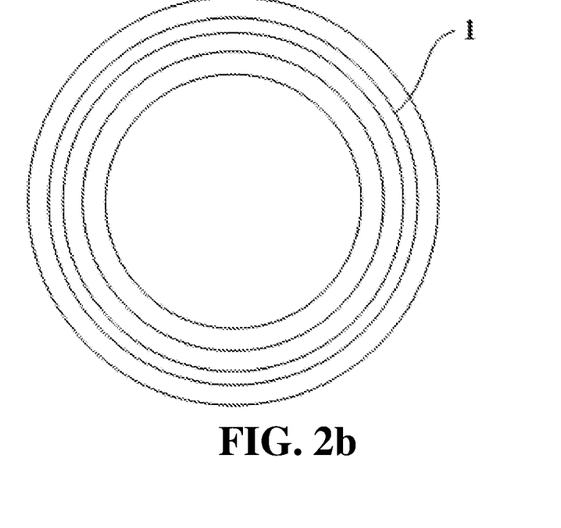
FIG. 2b is a schematic top diagram of the structure of a first liquid receiver body according to some embodiments of the present disclosure.
Figure 2C:
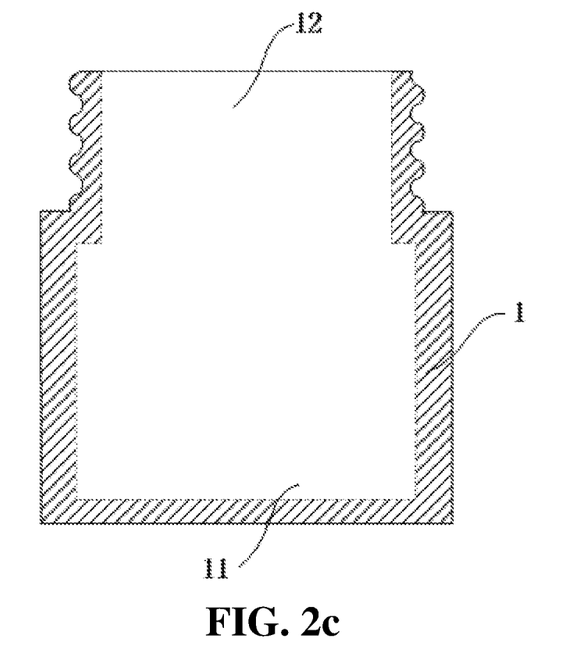
FIG. 2c is a schematic cross-sectional diagram of the structure of a first liquid receiver body according to some embodiments of the present disclosure.

Referring to FIG. 2a to FIG. 2c, the first liquid receiver body 1 and the second liquid receiver body 5 are used as containers for holding to-be-soaked substances and water. External shapes of the first liquid receiver body 1 and the second liquid receiver body 5 are not limited, and may be a cylinder, a rectangle, a hexagon, an octagon and any other shape. A connecting part between the first liquid receiver body 1 and the connector 2 and a connecting part between the second liquid receiver body 5 and the connector 2 are hollow cylinders, and one end inside the connector 2 (i.e., the first open end 12 and the second open end 52) is an open hollow cylinder with threads.

Referring to FIG. 1 and FIG. 3a to FIG. 3c, the connector 2 connects and fixes the first liquid receiver body 1 and the second liquid receiver body 5. The connector 2 has two open ends, and an inner wall of the through-hole has a threaded structure. The outer shape of the connector 2 is, for example, a cylinder with two open ends, a square, a hexagon, an octagon and any other shape with two open ends. No matter what shape the outer side is in, the inner side (that is, the part connected to the first liquid receiver body 1 and the second liquid receiver body 5) is a hollow circular ring, and an inner cavity thereof is provided with male or female threads matching threads of the first liquid receiver body 1 and the second liquid receiver body 5.

It would be appreciated that, by reasonably setting the positions of the male and female threads, the first open end 12 and the second open end 52 are constructed to be detachably connected. That is, one of the first connection end 201 and the second connection end 202 of the connector 2 is provided with male threads, and the other is provided with female threads. One of the first open end 12 and the second open end 52 is provided with male threads, and the other is provided with female threads. Certainly, other structures can also be used to realize that the first liquid receiver body 1, the second liquid receiver body 5 and the connector 2 jointly form a closed utensil. In the meantime, after the connector 2 is removed, the first liquid receiver body 1 and the second liquid receiver body 5 also can form a closed utensil.

The first liquid receiver body 1 and the second liquid receiver body 5 are connected to or separated from the connector 2 by twisting the first liquid receiver body 1 and the second liquid receiver body 5.

The integrated brewing and drinking utensil provided in the above technical solution includes a first liquid receiver body 1 and a second liquid receiver body 5, and a connector 2 is disposed between the first liquid receiver body 1 and the second liquid receiver body 5, through which a closed inner cavity of the integrated brewing and drinking utensil is formed. A filter 4 disposed between the first liquid receiver body 1 and the second liquid receiver body 5 has a function of allowing fluid to pass through but not allowing large-sized solid such as tea leaves to pass through, that is, the filtering hole 41 is constructed to block solid and allow fluid to pass through, so that the integrated brewing and drinking utensil can function as a filtering utensil, a tea-brewing utensil and a drinking utensil at the same time.

Optional implementation modes of the filter 4 are introduced below.

In some embodiments, the filter 4 adopts a separate structure, which can be detachably or fixedly connected to the connector 2. In some other embodiments, the filter 4 is directly integrated with the connector 2. Either way, the structure of the filtering hole 41 can be the following various structures.

Referring to FIG. 4 to FIG. 8, specifically, an inner wall of the connector 2 is provided with or integrated with a filter 4 located on the cross section of the connector 2. The filter 4 is provided with a filtering hole 41. When the first liquid receiver body 1 and the second liquid receiver body 5 are connected to the connector 2, the filtering hole 41 is in fluid communication with the first liquid receiver body 1 and the second liquid receiver body 5.

When the integrated brewing and drinking utensil stands, stands upside down or tilts, the liquid can pass smoothly and quickly through the filtering hole 41 of the filter 4 and flow from the upper liquid receiver body into the lower liquid receiver body. The filtering hole 41 of the filter 4 allows the solid placed in the upper liquid receiver body or the lower liquid receiver body to be separated at the upper or lower end by the filter 4. That is, the filtering hole 41 of the filter 4 is a structure with a filtering function.

In some embodiments, the cross-section shape of the filter hole 41 includes at least one of the following: a herringbone shape, a circle shape, a slit shape, and a rectangle shape.

The so-called herringbone shape means that there are three slits, one ends of which are converged, and the three slits are spaced 120 degrees apart.

Figure 5:
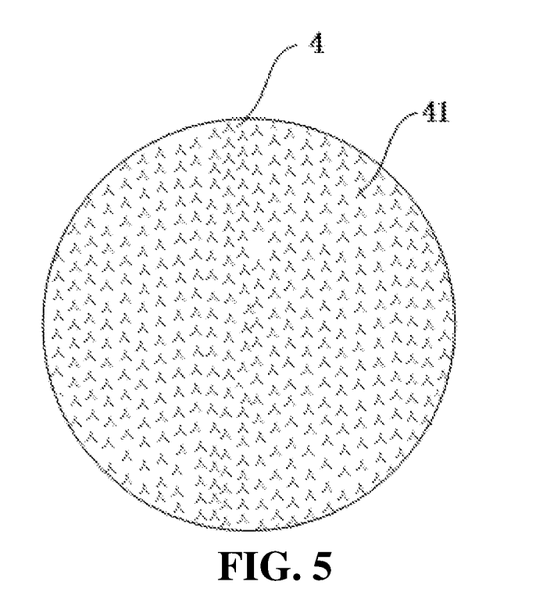
FIG. 5 is a schematic structural diagram of a filter provided with a herringbone-shaped filtering hole according to some embodiments of the present disclosure.

Referring to FIG. 5, FIG. 5 is a schematic structural diagram showing that the cross section of the filtering hole 41 is in a herringbone shape. Even if the size of the filtering hole 41 is small, it is easy for fluid to pass through the filtering hole 41 in the herringbone shape, and liquid will not be adsorbed at the filtering hole 41.

Figure 6:
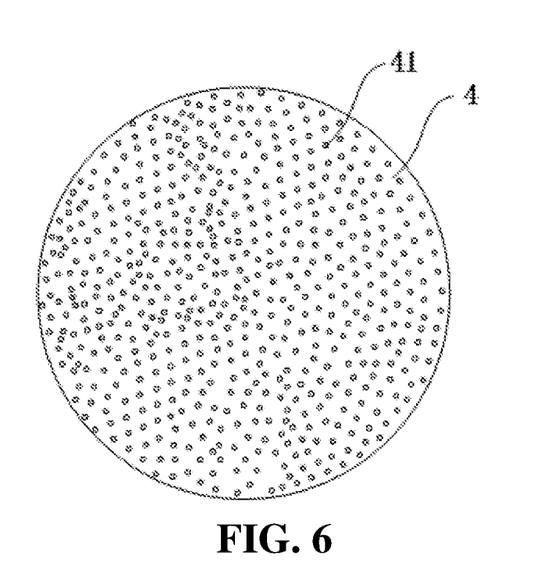
FIG. 6 is a schematic structural diagram of a filter provided with a circle-shaped filtering hole according to some embodiments of the present disclosure.

Referring to FIG. 6, FIG. 6 is a schematic structural diagram showing that the cross section of the filtering hole 41 is in a circle shape. The filtering hole 41 in the circle shape is convenient for processing and manufacturing.

Figure 7:
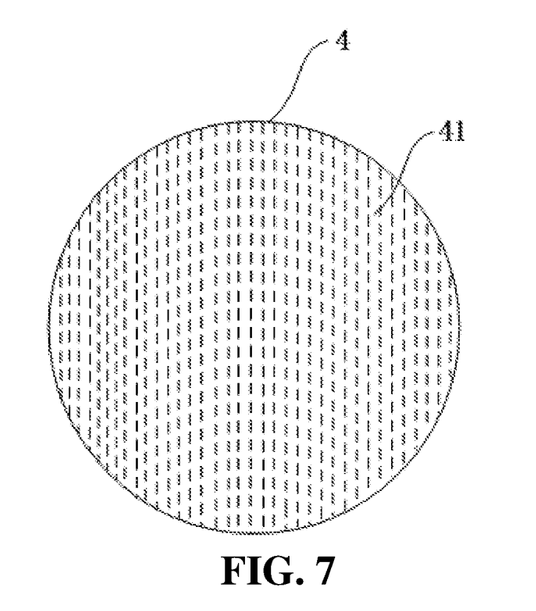
FIG. 7 is a schematic structural diagram of a filter provided with a slit-shaped filtering hole according to some embodiments of the present disclosure.

Referring to FIG. 7, FIG. 7 is a schematic structural diagram showing that the cross section of the filtering hole 41 is in a slit shape. The filtering hole 41 in the slit shape is convenient for processing and manufacturing and has a high fluid passing rate.

Figure 8:
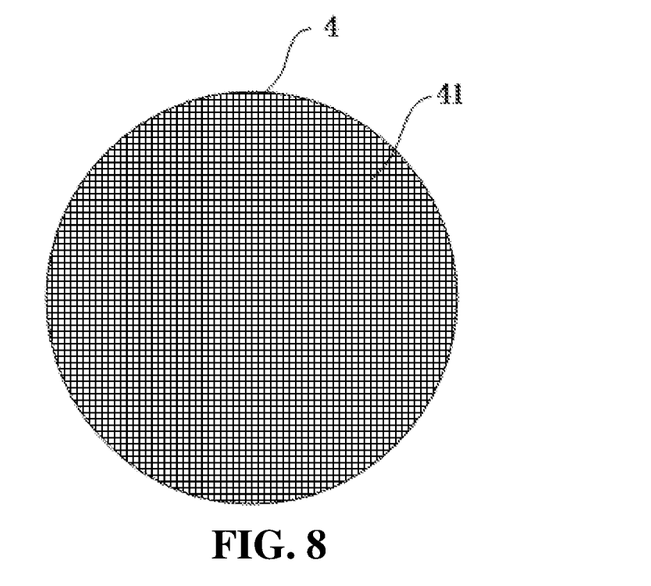
FIG. 8 is a schematic structural diagram of a filter provided with a rectangle-shaped filtering hole according to some embodiments of the present disclosure.

Referring to FIG. 8, FIG. 8 is a schematic structural diagram showing that the cross section of the filtering hole 41 is in a rectangle shape. The filtering hole 41 in the rectangle shape is convenient for processing and manufacturing.

In some embodiments, there are one or more filters 4, and the specific number is, for example, odd or even. According to requirements, the filter 4 blocks a substance to be soaked, such as tea leaves or coffee, or a substance that has been soaked at either of the upper end and the lower end bounded by the filter 4.

As described above, the filter 4 may adopt a detachable structure. If adopting the detachable structure, the filter 4 is movable and detachable. In use, the filter 4 is fixed by the connector 2 and the sealing member 3. When necessary, the filter 4 can be removed while the sealing member 3 is removed.

The above connection mode makes it very easy to disassemble the filter 4, so it is not only easy to clean the filter 4, but also convenient to replace meshes with different functions and effects (i.e. different hole specifications) according to requirements. For example, a filter 4 with a different hole size can be used on each of the upper and lower sides of the second ring member 22.

In some other embodiments, the filter 4 is integrated with the connector 2. In this structure, the filter 4 does not need to be disassembled and assembled, making it more convenient to use the integrated brewing and drinking utensil.

Figure 3A:
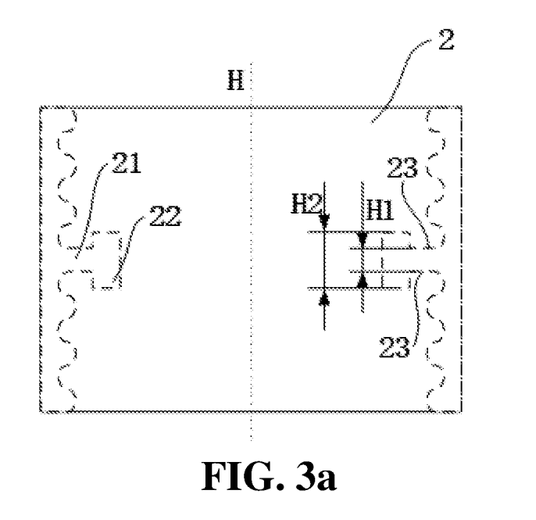
FIG. 3a is a schematic front diagram of the structure of a connector according to some embodiments of the present disclosure.
Figure 3B:
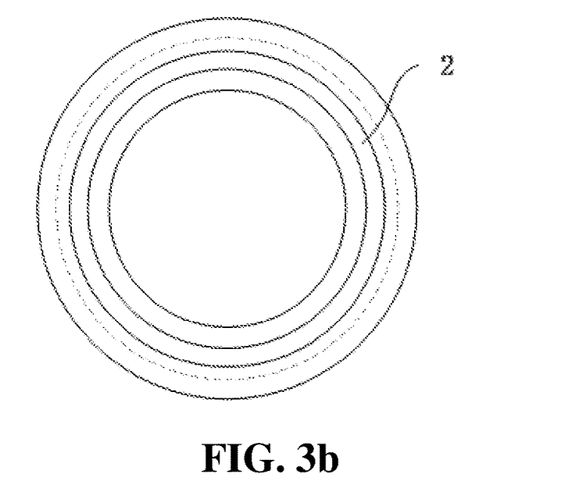
FIG. 3b is a schematic top diagram of the structure of a connector according to some embodiments of the present disclosure.
Figure 3C:
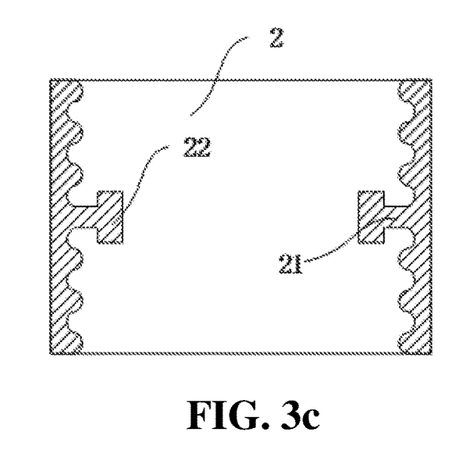
FIG. 3c is a schematic cross-sectional diagram of the structure of a connector according to some embodiments of the present disclosure.
Figure 4A:
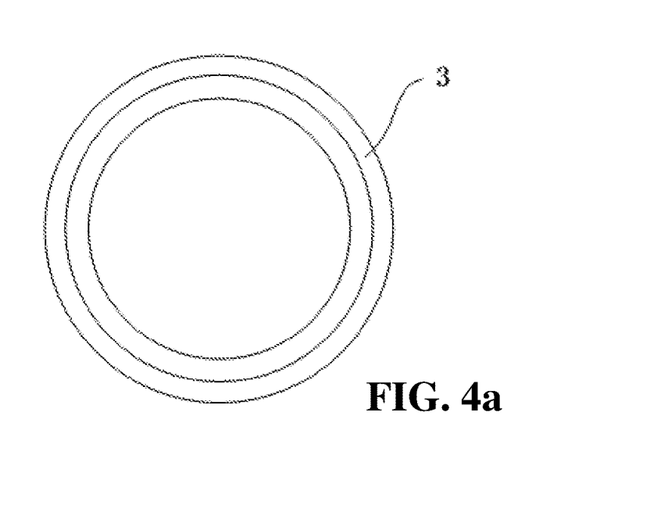
FIG. 4a is a schematic front diagram of the structure of a sealing member according to some embodiments of the present disclosure.
Figure 4B:
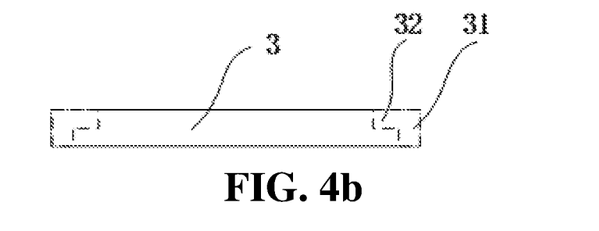
FIG. 4b is a schematic top diagram of the structure of a sealing member according to some embodiments of the present disclosure.
Figure 4C:
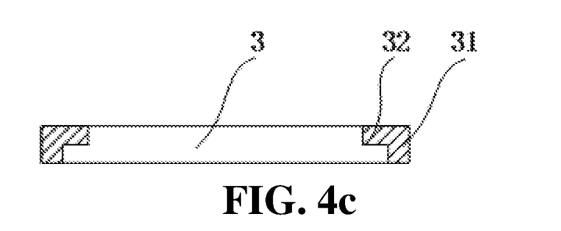
FIG. 4c is a schematic cross-sectional diagram of the structure of a sealing member in a top-view direction according to some embodiments of the present disclosure.

Referring to FIG. 1 and FIG. 3a to FIG. 3c, in some embodiments, a first ring member 21 is disposed on an inner wall of the connector 2, and an inner edge of the first ring member 21 is connected to a second ring member 22. Referring to FIG. 3a, the size H1 of the first ring member 21 along an axis direction H of the connector 2 is smaller than the size H2 of the second ring member 22 along the axis direction H of the connector 2. A groove 23 is formed between the first ring member 21 and the second ring member 22, and the sealing member 3 is mounted in the groove 23.

As shown in FIG. 3a, H2 is greater than H1, so two grooves (upper and lower) 23 are formed between the first ring member 21 and the second ring member 22, and a sealing member 3 is mounted in each of the grooves 23.

The inner wall of the connector 2 is integrated with or detachably connected to the first ring member 21. The first ring member 21 is integrated with or detachably connected to the second ring member 22.

In some embodiments, the inner wall of the connector 2 is integrated with the first ring member 21, and the first ring member 21 is also integrated with the second ring member 22. With the structure, when the integrated brewing and drinking utensil is in use, fewer components need to be disassembled and assembled, and disassembling and assembling are easier and more efficient.

Referring to FIG. 1 and FIG. 4a to FIG. 4c, in some embodiments, the sealing member 3 includes a connection part 31 and an abutment part 32, which are connected or integrated. The connection part 31 is inserted into the groove 23, and the abutment part 32 abuts against an end face of the second ring member 22.

The above connection mode makes the sealing member 3 firmly mounted in the groove 23.

Referring to FIG. 1 and FIG. 3a to FIG. 4c, in some embodiments, there are two grooves 23, wherein one is located on the side of the first connection end 201, and the other is located on the side of the second connection end 202; and the sealing member 3 is mounted in each of the grooves 23.

The sealing member 3 is mounted in each of the two grooves 23, so that the fluid is neither leaked from the connection between the first liquid receiver body 1 and the connector 2 of the integrated brewing and drinking utensil nor leaked from the connection between the second liquid receiver body 5 and the connector 2.

In some embodiments, the filter 4 is sandwiched by the abutment part 32 and an end face of the second ring member 22.

By taking the direction shown in FIG. 3*a* as an example, the filter 4 is sandwiched by an upper end face of the second ring member 22 and the sealing member 3, and/or the filter 4 is sandwiched by a lower end face of the second ring member 22 and the sealing member 3.

The sealing member 3 and the filter 4 can be easily removed by disassembling the first liquid receiver body 1 and the connector 2. The structure realizes convenient disassembling, assembling and cleaning of all parts of the integrated brewing and drinking utensil.

The filter 4 in the above manner is adopted, and a groove 23 is provided at a joint between the filter 4 and the inner cavity of the connector 2. The groove 23 is used to mount a sealing member 3 with a leak-proof function, which is made of, for example, an elastic material. The sealing members 3 are embedded into the two grooves 23 respectively. Referring to FIG. 1 and FIG. 3*a*, the sealing member 3 in the upper groove 23 is a buffer component between the first liquid receiver body 1 and the connector 2, and the sealing member 3 in the lower groove 23 is a buffer component between the second liquid receiver body 5 and the connector 2.

When the first liquid receiver body 1 and the second liquid receiver body 5 are tightened to the connector 2 by threads, the sealing members 3 can function as a buffer between the filter 4 and the first liquid receiver body 1 and a buffer between the filter 4 and the second liquid receiver body 5 based on elastic characteristics of the sealing members 3, so that the first liquid receiver body 1 and the second liquid receiver body 5 are seamlessly connected to achieve the function of leakage prevention. As the sealing members 3 are embedded into the grooves 23, the sealing members 3 can be attached to the connector 2 without falling off when the first liquid receiver body 1 and the second liquid receiver body 5 are separated from connector 2.

In some embodiments, the first liquid receiver body 1 is made of a transparent material, and/or the second liquid receiver body 5 is made of a transparent material.

In some embodiments, the material of the first liquid receiver body 1 is selected from one of the following: stainless steel, plastic, glass, ceramic, silica gel, and wood.

In some embodiments, the material of the second liquid receiver body 5 is selected from one of the following: stainless steel, plastic, glass, ceramic, silica gel, and wood.

In some embodiments, the material of the connector 2 is selected from one of the following: stainless steel, plastic, glass, ceramic, silica gel, and wood.

In some embodiments, the cup wall of the first liquid receiver body 1 is constructed to be a double-layer hollow wall or multi-layer hollow wall.

In some embodiments, the cup wall of the second liquid receiver body 5 is constructed to be a double-layer hollow wall or multi-layer hollow wall.

In some embodiments, the first liquid receiver body 1 has a capacity of 50 ml to 1000 ml; and/or the second liquid receiver body 5 has a capacity of 50 ml to 1000 ml.

The capacity of the first liquid receiver body 1 and the capacity of the second liquid receiver body 5 may be selected from 50 ml to 1000 ml, preferably from 80 ml to 1000 ml, more preferably from 100 ml to 900 ml, and optimally from 100 ml to 600 ml.

In some embodiments, the capacity of the first liquid receiver body 1 is different from that of second liquid receiver body 5.

In some embodiments, the capacity of the first liquid receiver body 1 is 1/20 to 5/6 of the capacity of the second liquid receiver body 5.

In actual use, the capacity of the upper section of the integrated brewing and drinking utensil is smaller than that of the lower section of the integrated brewing and drinking utensil. The capacity ratio of the first liquid receiver body 1 to the second liquid receiver body 5 is, for example, 1:9, or 1:5, or 1:4, or 1:3, or 1:2.

The first liquid receiver body 1 can be used as a cup, and the second liquid receiver body 5 can be used as a teapot, or vice versa. The structure realizes the simple integration of a tea-brewing utensil and a drinking utensil, namely, a teapot and a cup.

The use process of the above integrated brewing and drinking utensil is as follows: after a solid drink is put into the first liquid receiver body 1, the first liquid receiver body 1 is connected to the connector 2, which is then isolated by the filter 4 at the end of the integrated brewing and drinking utensil where the solid drink is placed. After water or hot water is put into the second liquid receiver body 5, the second liquid receiver body 5 is also connected to the connector 2. In this case, the first liquid receiver body 1 holding the solid drink is located above, and the second liquid receiver body 5 holding water or hot water is located below. After the connection, the integrated brewing and drinking utensil stands upside down, the water or hot water flows through the connector 2 into the end where the solid drink is placed, and then the drink can be soaked in the water or hot water. After brewing, the integrated brewing and drinking utensil is turned upside down, making the brewing liquid flow through the filter 4 back to the end of the integrated brewing and drinking utensil where the water or hot water is received. When the end of the integrated brewing and drinking utensil where the water is received is designed as a drinking utensil, a cup of beverage filtered by the filter 4 and having little residue is obtained by unscrewing the integrated brewing and drinking utensil.

Some drinks need to be soaked in multiple solutions for a long time. Under this circumstance, the to-be-soaked solid can be placed in the lower liquid receiver body which is connected to the connector 2 after water or hot water is added thereto. In this case, the upper liquid receiver body functions as a lid and a drinking utensil.

Some other embodiments are introduced below.

In these embodiments, one of the first end 11 and the second end 51 is constructed as flexible to open and close, and the other is closed, for realizing drinking of the drink in the utensil through at least one of the first end 11 and the second end 51, that is, realizing drinking of the drink in the first liquid receiver body 1 and the second liquid receiver body 5. Alternatively, both the first end 11 and the second end 51 are constructed as flexible to open and close, for realizing drinking of the drink in the utensil through at least one of the first end 11 and the second end 51, that is, realizing drinking of the drink in the first liquid receiver body 1 and the second liquid receiver body 5. Alternatively, both the first end 11 and the second end 51 are constructed as closed.

The structures of the first end 11 and the second end 51 are, for example, the same or different.

An optional specific implementation mode when the first end 11 is a structure that can be opened and closed is introduced below.

Figure 9:
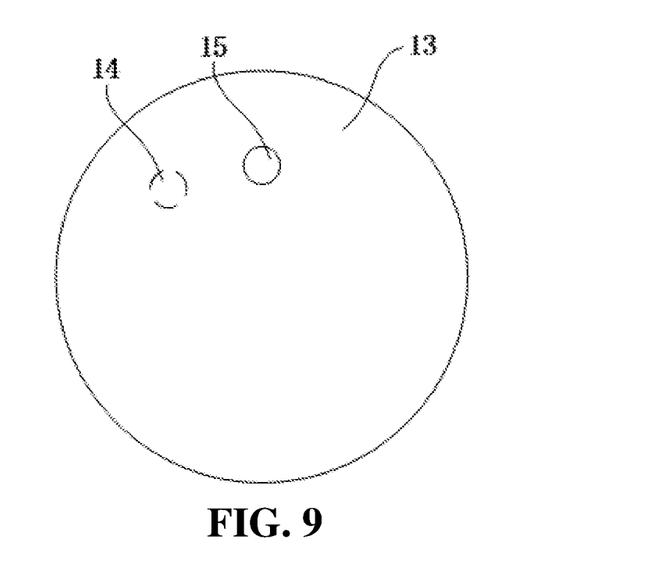
FIG. 9 is a schematic top diagram of the structure of an integrated brewing and drinking utensil according to some other embodiments of the present disclosure.

Referring to FIG. 9, if the first end 11 is opened and closed by means of rotation, a specific implementation mode is, for example, as follows: the first end 11 is provided with a first through-hole 14, the first end 11 is rotatably provided with a first cover 13, and the first cover 13 is provided with a second through-hole 15. The first cover 13 is constructed as switchable between the following two positions: that is, the first cover 13 rotates relative to the first end 11 to a position where the first through-hole 14 is in communication with the second through-hole 15, and the first cover 13 rotates relative to the first end 11 to a position where the first through-hole 14 is staggered from the second through-hole 15.

When the first cover 13 rotates relative to the first end 11 to the position where the first through-hole 14 is in communication with the second through-hole 15, the position enables a user to drink the drink in the drinking utensil.

When the first cover 13 rotates relative to the first end 11 to the position where the first through-hole 14 is staggered from the second through-hole 15, the first end 11 is closed. The first cover 13 is hermetically connected to the first end 11 to prevent the drink in the integrated brewing and drinking utensil from leaking from the first end 11.

The first cover 13 is provided with, for example, a turning part that is easy to turn, so that the first cover 13 rotates relative to the first end 11. The turning part is, for example, a surface with a friction pattern, or the turning part is a projection or a ring projected from the surface of the first cover 13.

In some embodiments, the first end 11 and the second end 13 are provided with a limiting structure on a rotary mating surface. For example, there are two limiting structures, one is used to remind the user that the first cover 13 is already in a drinkable position, and the other is used to remind the user that the first cover 13 has been closed and is in an undrinkable position.

If the first end 11 is opened and closed by means of pressing, a specific implementation mode is, for example, as follows: the first end 11 is provided with a first through-hole 14 where a control valve is mounted. The control valve employs a structure of a press-type valve. The control valve is pressed down, and the first through-hole 14 is opened. The position enables the user to drink the drink in the integrated brewing and drinking utensil. When the control valve is pressed once again, the first through-hole 14 is closed. The position causes the first end 11 to be closed, and the user cannot drink the drink in the integrated brewing and drinking utensil.

All the above implementation modes enable an operator to control opening and closing states of the first end 11 with one hand, so that the user can have the drink with a single hand.

If the second end 51 also adopts a structure that can be opened and closed, its implementation mode is, for example, the same as that of the first end 11. Please refer to the descriptions about the first end 11 for the content not detailed hereinafter.

In some embodiments, the second end 51 is constructed to open and close with one of the following structures: a rotatable structure and a press-type structure.

In some embodiments, the second end 51 is provided with a third through-hole, and the second end 51 is rotatably provided with a second cover. The second cover is provided with a fourth through-hole. The second cover is constructed as switchable between the following two positions: the second cover rotates relative to the second end 51 to a position where the third through-hole is in communication with the fourth through-hole, and the second cover rotates relative to the second end 51 to a position where the third through-hole is staggered from the fourth through-hole to close the second end 51.

All the above implementation modes enable an operator to control opening and closing states of the second end 51 with one hand, so that the user can have the drink with a single hand.

In the descriptions of the present disclosure, it would be appreciated that the orientation or position relations indicated by the terms "center," "longitudinal," "transverse," "front," "back," "left," "right," "vertical," "horizontal," "top," "bottom," "inside" and "outside" are based on the orientation or position relations shown in the accompanying drawings, are only for the convenience of describing the embodiments of the present disclosure and simplifying the description, rather than indicating or implying that the apparatus or element referred to must have a specific orientation and be constructed and operated from that orientation. Therefore, such terms cannot be interpreted as the limitations to the protection content of the present disclosure.

Finally, it should be noted that the above embodiments are merely provided for describing the technical solutions of the present disclosure and are not intended to limit the present disclosure. It should be understood by those of ordinary skill in the art that although the present disclosure has been described in detail with reference to the above embodiments, modifications can still be made to the technical solutions described in the above embodiments, or equivalent replacements can be made to some technical features in the technical solutions, as long as such modifications or replacements do not cause the essence of corresponding technical solutions to depart from the spirit and scope of the technical solutions in the embodiments of the present disclosure.

The invention claimed is:

1. An integrated brewing and drinking utensil, comprising:
   a first liquid receiver body comprising a first end and a first open end;
   a second liquid receiver body comprising a second end and a second open end;
   a connector comprising a channel, wherein the channel comprises a first connection end and a second connection end; wherein the first connection end is detachably connected to the first open end, and wherein the second connection end is detachably connected to the second open end;
   a sealing member, through which the first connection end is hermetically connected to the connector and/or the second connection end is hermetically connected to the connector; and
   a filter provided with a filtering hole, wherein the filtering hole is configured to allow fluid to pass through; and wherein the filter is mounted between the first connection end and the second connection end and connects the first liquid receiver body and the second liquid receiver body, wherein a first ring member is disposed on an inner wall of the connector, and an inner edge of the first ring member is connected to a second ring member; and the size of the first ring member along an axis direction of the connector is smaller than that of the second ring member along the axis direction of the connector; wherein a groove is formed between the first ring member and the second ring member, and the sealing member is mounted in the groove.

2. The integrated brewing and drinking utensil according to claim 1, wherein the filtering hole is configured to block solid and allow fluid to pass through.

3. The integrated brewing and drinking utensil according to claim 1, wherein the filter is detachably connected to, or fixedly connected to, or integrated with the connector.

4. The integrated brewing and drinking utensil according to claim 1, wherein the sealing member comprises a connection part and an abutment part, which are connected or integrated, wherein the connection part is inserted into the groove, and the abutment part abuts against an end face of the second ring member.

5. The integrated brewing and drinking utensil according to claim 1, wherein there are two grooves, one is located on the side of the first connection end, and the other is located on the side of the second connection end, and wherein the sealing member is mounted in each of the grooves.

6. The integrated brewing and drinking utensil according to claim 1, wherein the filter is sandwiched by the abutment part and an end face of the second ring member.

7. The integrated brewing and drinking utensil according to claim 1, wherein the first ring member is integrated with the connector, and the first ring member is also integrated with the second ring member.

8. The integrated brewing and drinking utensil according to claim 1, wherein the first connection end is connected to the first open end by threads; and/or, the second connection end is connected to the second open end by threads.

9. The integrated brewing and drinking utensil according to claim 1, wherein one of the first end and the second end is constructed as one of the following structures, and the other is closed: a rotatable opening and closing structure, a pressable opening and closing structure, and an engageable opening and closing structure, to drink drinks in the first liquid receiver body and the second liquid receiver body.

10. The integrated brewing and drinking utensil according to claim 1, wherein the first open end and the second open end are constructed to be detachably connected.

11. The integrated brewing and drinking utensil according to claim 1, wherein the cross-section shape of the filtering hole comprises at least one of the following: a herringbone shape, a circle shape, a slit shape, or a rectangle shape.

12. The integrated brewing and drinking utensil according to claim 1, wherein both the first end and the second end are constructed as one of the following structures: a rotatable opening and closing structure, a pressable opening and closing structure, and an engageable opening and closing structure, to drink drinks in the first liquid receiver body and the second liquid receiver body.

13. The integrated brewing and drinking utensil according to claim 1, wherein both the first end and the second end are closed.

14. An integrated brewing and drinking utensil, comprising:
a first liquid receiver body comprising a first end and a first open end;
a second liquid receiver body comprising a second end and a second open end;
a connector comprising a channel, wherein the channel comprises a first connection end and a second connection end; wherein the first connection end is detachably connected to the first open end, and wherein the second connection end is detachably connected to the second open end;
a sealing member, through which the first connection end is hermetically connected to the connector and/or the second connection end is hermetically connected to the connector; and a filter provided with a filtering hole, wherein the filtering hole is configured to allow fluid to pass through; and wherein the filter is mounted between the first connection end and the second connection end and connects the first liquid receiver body and the second liquid receiver body, wherein at least one of the first end or the second end is constructed as one of the following structures: a pressable opening and closing structure, or a rotatable opening and closing structure.

15. The integrated brewing and drinking utensil according to claim 14, wherein one of the first end and the second end is constructed as a rotatable opening and closing structure, and the other is closed, to drink drinks in the first liquid receiver body and the second liquid receiver body.

16. The integrated brewing and drinking utensil according to claim 14, wherein one of the first end and the second end is constructed as a pressable opening and closing structure, and the other is closed, to drink drinks in the first liquid receiver body and the second liquid receiver body.

17. The integrated brewing and drinking utensil according to claim 14, wherein both the first end and the second end are constructed as a rotatable opening and closing structure, to drink drinks in the first liquid receiver body and the second liquid receiver body.

18. The integrated brewing and drinking utensil according to claim 14, wherein both the first end and the second end are constructed as a pressable opening and closing structure, to drink drinks in the first liquid receiver body and the second liquid receiver body.

* * * * *